(12) United States Patent
Ha et al.

(10) Patent No.: US 11,579,064 B2
(45) Date of Patent: Feb. 14, 2023

(54) SMALL APPARATUS FOR IDENTIFYING BIOLOGICAL PARTICLES

(71) Applicant: AGENCY FOR DEFENSE DEVELOPMENT, Daejeon (KR)

(72) Inventors: Yeon Chul Ha, Daejeon (KR); Ki Bong Choi, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 386 days.

(21) Appl. No.: 16/650,534

(22) PCT Filed: Jul. 31, 2019

(86) PCT No.: PCT/KR2019/009575
§ 371 (c)(1),
(2) Date: Mar. 25, 2020

(87) PCT Pub. No.: WO2021/020628
PCT Pub. Date: Feb. 4, 2021

(65) Prior Publication Data
US 2021/0404933 A1 Dec. 30, 2021

(30) Foreign Application Priority Data
Jul. 31, 2019 (KR) .......................... 10-2019-0093318

(51) Int. Cl.
| | |
|---|---|
| *G01N 15/02* | (2006.01) |
| *G01N 1/14* | (2006.01) |
| *G06T 7/00* | (2017.01) |
| *G01N 15/00* | (2006.01) |

(52) U.S. Cl.
CPC ........... *G01N 15/0227* (2013.01); *G01N 1/14* (2013.01); *G06T 7/0012* (2013.01); *G01N 2001/1436* (2013.01); *G01N 2015/0069* (2013.01); *G06T 2207/30024* (2013.01)

(58) Field of Classification Search
CPC ................. G01N 15/0227; G01N 1/14; G01N 2001/1436; G01N 2015/0069; G01N 15/1463; G01N 2015/1006; G01N 1/4077; G01N 2001/4088; G01N 2015/1465; G01N 2015/1486; G01N 15/02; G01N 1/10; G01N 15/14; G01N 33/53; G06T 7/0012; G06T 2207/30024
See application file for complete search history.

(56) References Cited

U.S. PATENT DOCUMENTS

| | | | |
|---|---|---|---|
| 2006/0257941 A1* | 11/2006 | McDevitt | G01N 33/5302 435/7.2 |
| 2019/0041307 A1* | 2/2019 | Ingber | G01N 1/4077 |

FOREIGN PATENT DOCUMENTS

KR 10-1310116 B1 9/2013

* cited by examiner

*Primary Examiner* — Tracy Y. Li
(74) *Attorney, Agent, or Firm* — Goldilocks Zone IP Law

(57) ABSTRACT

The present invention relates generally to an apparatus for identifying biological particles. More particularly, the present invention relates to a small apparatus for identifying biological particles, wherein in a single apparatus having a simple structure, a cleaning solution is suctioned to separate the biological particles from a filter and a sample solution is discharged, the discharged sample solution is injected into a plurality of ticket modules, and the biological particles are identified by image analysis for the ticket modules, thereby enabling miniaturization of the apparatus.

6 Claims, 6 Drawing Sheets

[FIG. 1]
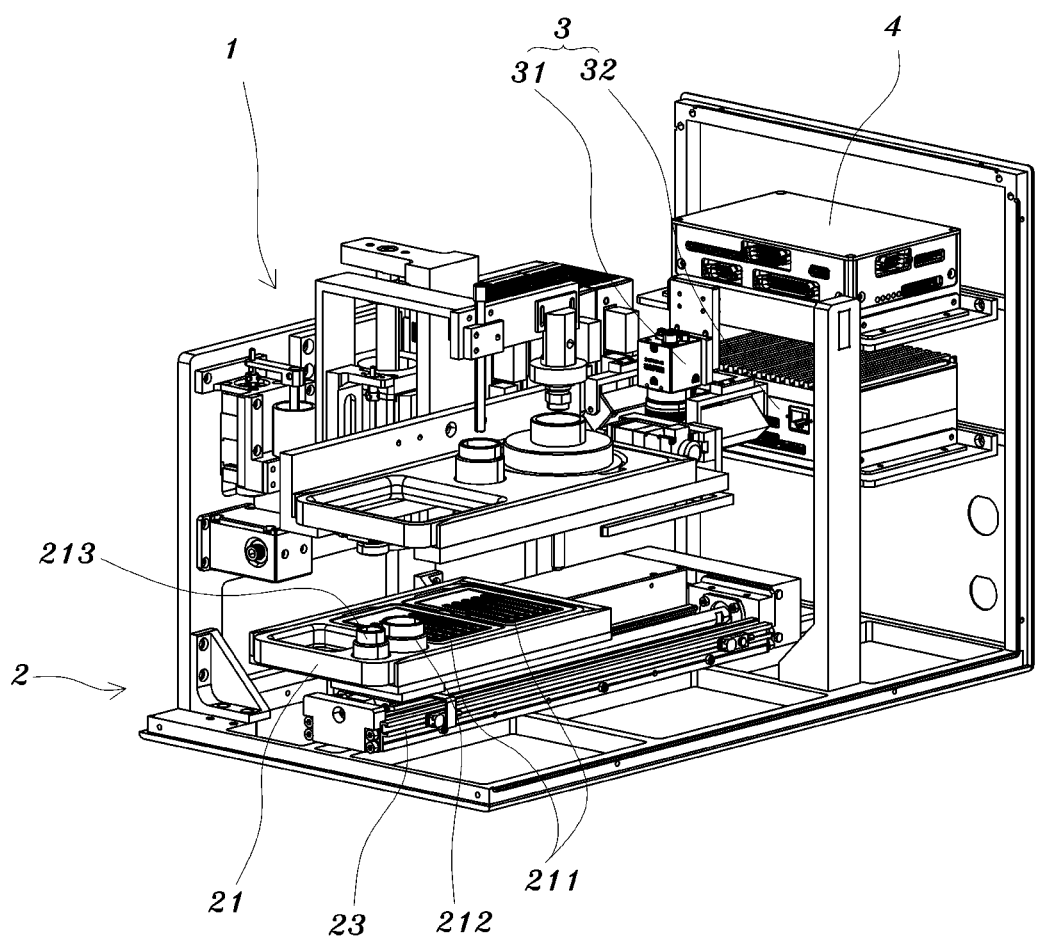

[FIG. 2]
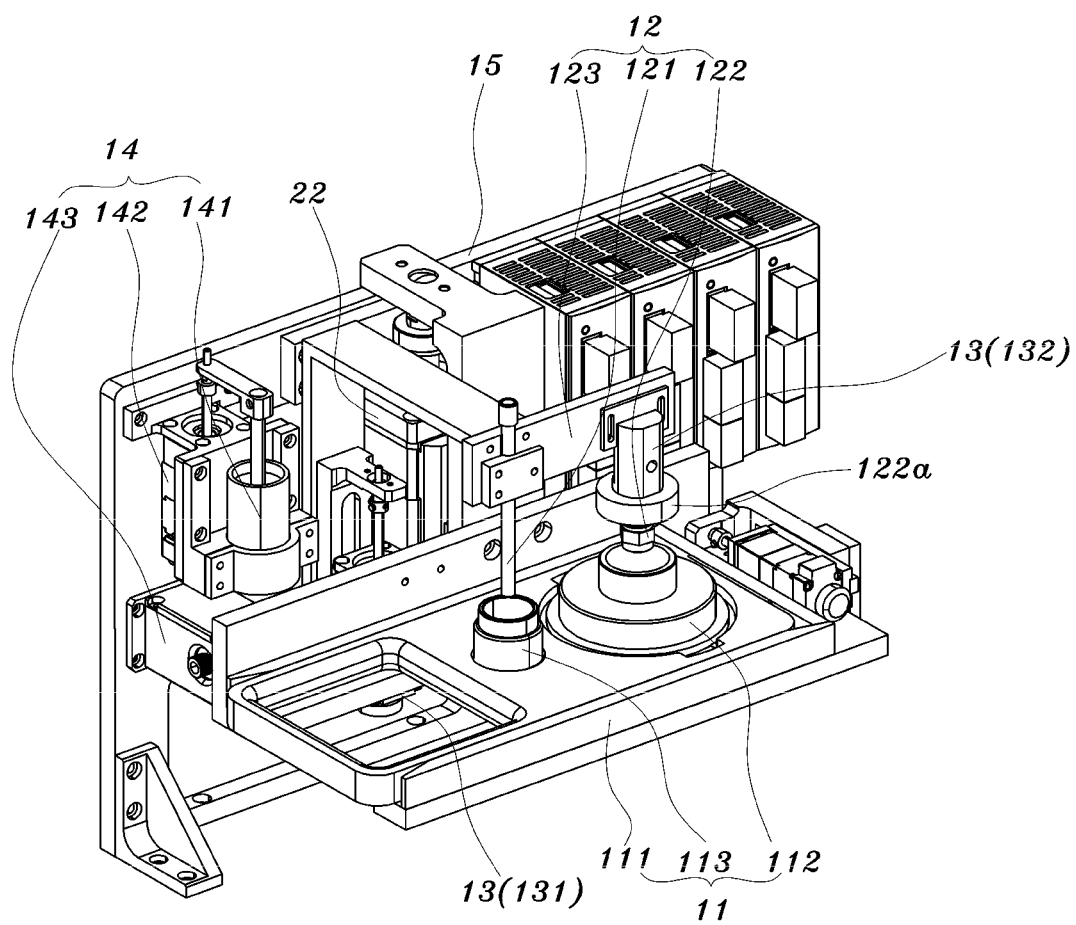

[FIG. 3]
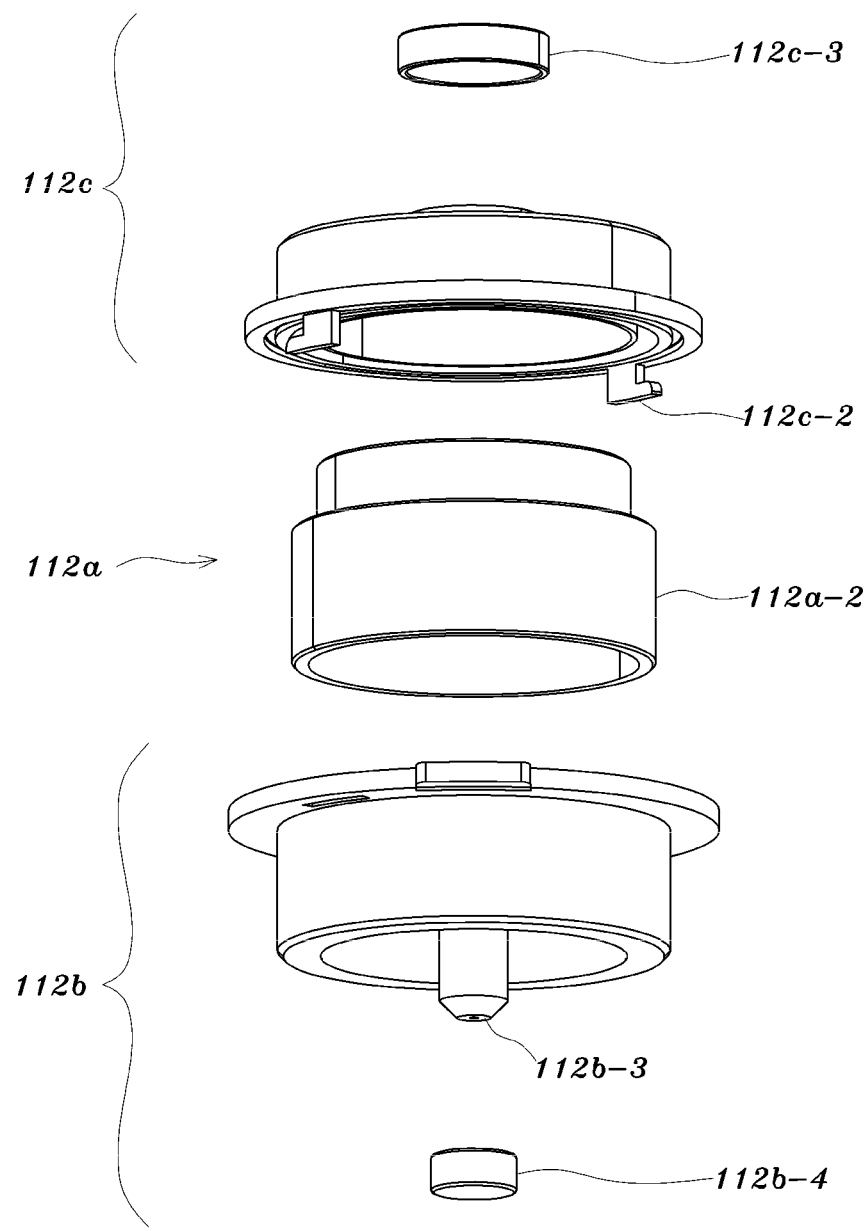

[FIG. 4]
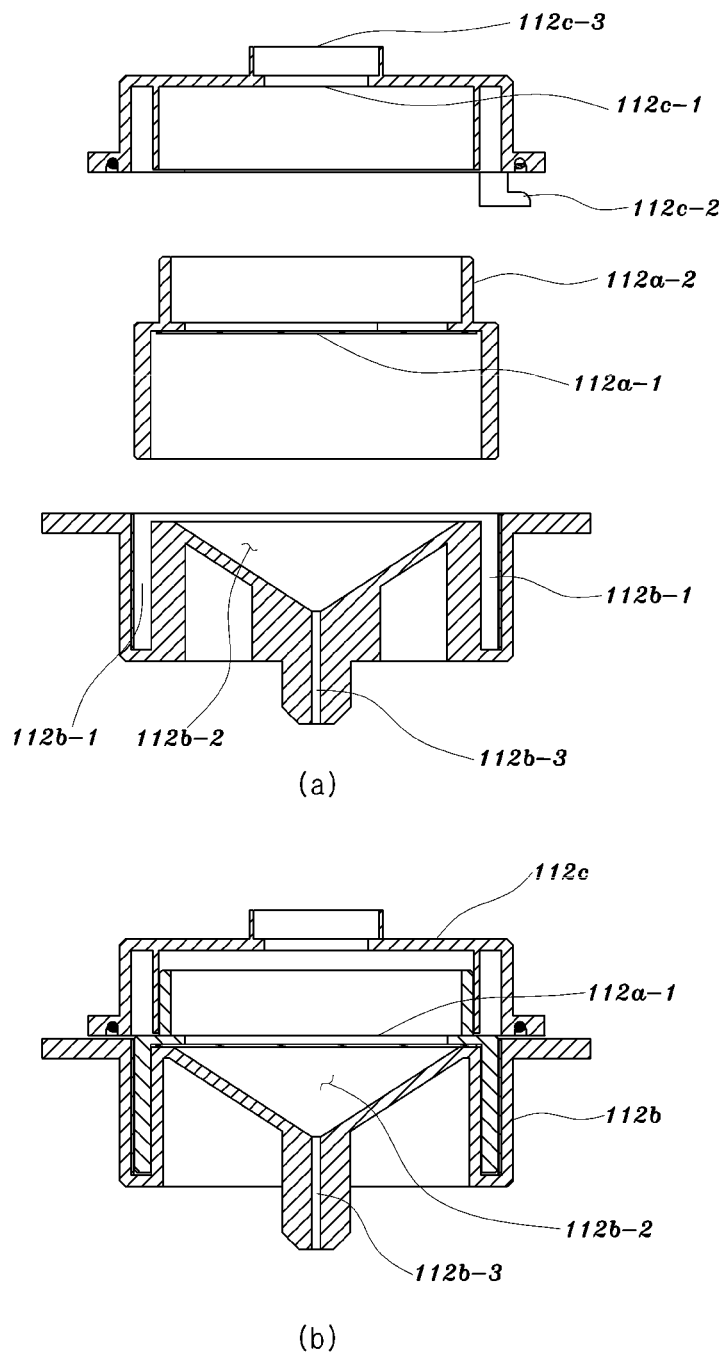

[FIG. 5]
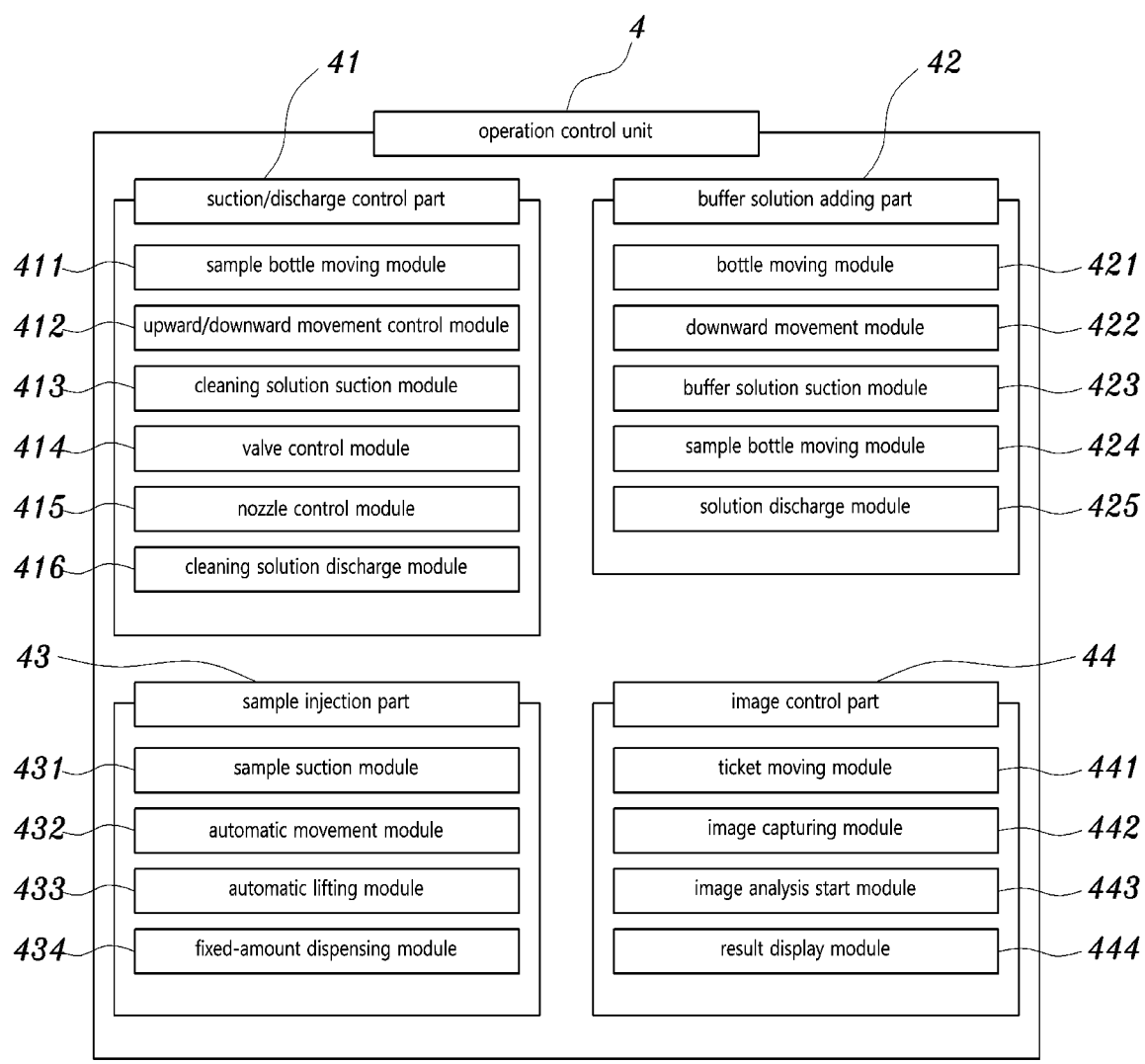

[FIG. 6]
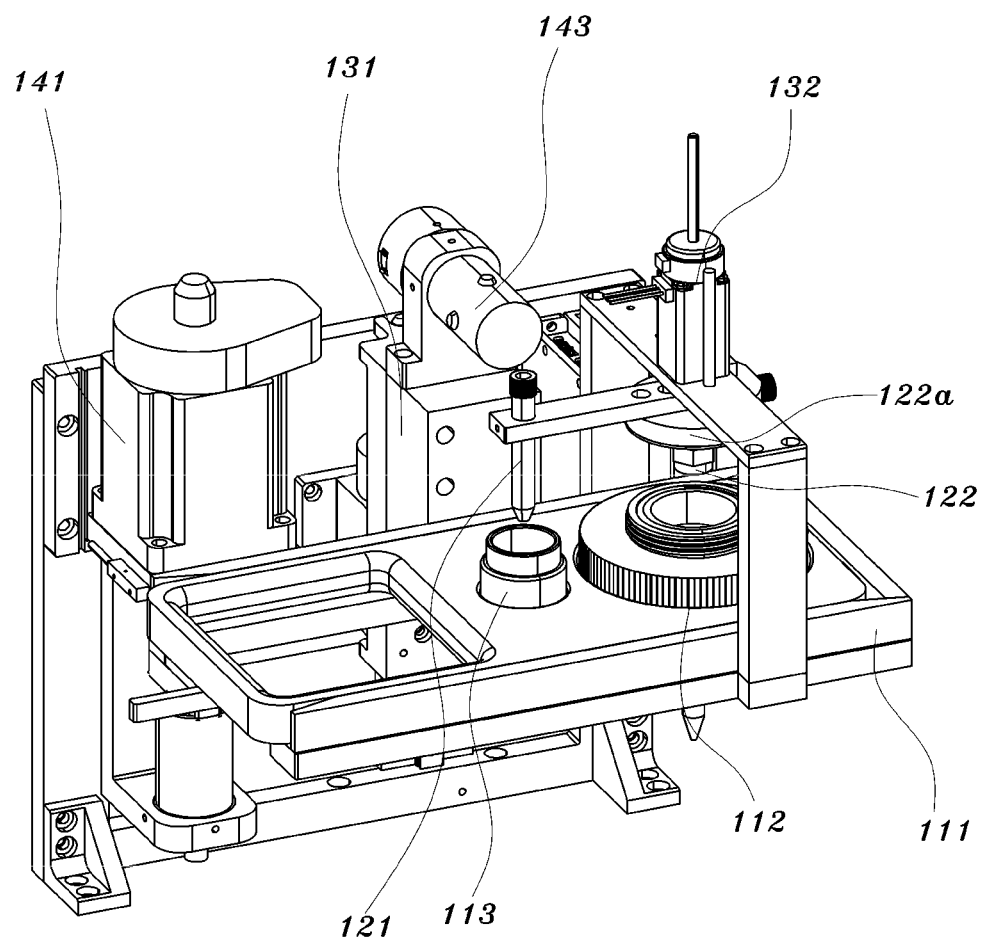

SMALL APPARATUS FOR IDENTIFYING BIOLOGICAL PARTICLES

CROSS-REFERENCE TO RELATED APPLICATIONS

This application claims the benefit under 35 U.S.C. section 371, of PCT International Application No. PCT/KR2019/009575, filed on Jul. 31, 2019, which claims foreign priority to Korean Patent Application No. KR10-2019-0093318, filed on Jul. 31, 2019, in the Korean Intellectual Property Office, both of which are hereby incorporated by reference in their entireties.

TECHNICAL FIELD

The present invention relates generally to an apparatus for identifying biological particles. More particularly, the present invention relates to a small apparatus for identifying biological particles, wherein in a single apparatus having a simple structure, a cleaning solution is suctioned to separate the biological particles from a filter and a sample solution is discharged, the discharged sample solution is injected into a plurality of ticket modules, and the biological particles are identified by image analysis for the ticket modules, thereby enabling miniaturization of the apparatus.

BACKGROUND ART

The threat of bioterrorism has been increased because biological agents are easy to develop as weapons, and are easy to transport and release. These agents can be widely spread by carriers who travel by public transportation and high-speed transportation means during the incubation period, causing much damage due to psychological panic and severe economic chaos.

As can be seen from the economic and social ramifications of MERES and severe acute respiratory syndrome (SARS), which have recently occurred in many countries, it is predicted that the deadly spread of virus by human-made intentional terror attacks will cause more panic to the public.

Therefore, it is necessary to detect bacteria released into the atmosphere artificially by terrorists in real time and take countermeasures. However, the released bacteria cannot be detected because they stay suspended in the air as invisible fine particles, and due thereto, a specialized detection apparatus is required separately. For this purpose, apparatuses capable of detecting and identifying biological particles have been developed as described in the following patent document.

One example of these apparatuses is configured to separate a filter from field detection equipment for precise identification and analysis of the biological particles, and to analyze the biological particles trapped by the filter in a separate identification device. In this case, the biological particles may scatter around the filter during transfer of the filter, and thus the biological particles may be contaminated by the surrounding environment.

Furthermore, rapid identification and analysis of the biological particles are important. However, such an identification apparatus in the related art is problematic in that it may be difficult to rapidly analyze many kinds of biological particles simultaneously, and the configuration of the apparatus may be complicated and enlarged, thereby making it difficult to move the apparatus.

Patent Document

Korean Patent No. 10-1310116 (registered on Sep. 12, 2013) "Integrated detection and identification device for biological agent"

DISCLOSURE

Technical Problem

Accordingly, the present invention has been made keeping in mind the above problems occurring in the related art, and an objective of the present invention is to provide a small apparatus for identifying biological particles, wherein in a single apparatus having a simple structure, a cleaning solution is suctioned to separate the biological particles from a filter and a sample solution is discharged, the discharged sample solution is injected into a plurality of ticket modules, and the biological particles are identified by image analysis for the ticket modules, thereby enabling miniaturization of the apparatus.

Another objective of the present invention is to provide a small apparatus for identifying biological particles, in which a filter module such as monitoring equipment is transferred in a sealed state by using a filter assembly and mounted to the apparatus, thereby preventing contamination of a filter and the surrounding environment thereof and enabling easy transfer and mounting of the filter module.

Another objective of the present invention is to provide a small apparatus for identifying biological particles, in which a filter mounting part and a nozzle module are movable in upward and downward directions, and a ticket module and a sample bottle are movable in forward, rearward, leftward, and rightward directions, whereby discharging and injection of a solution, image capturing, and biological particle identification are performed quickly and easily.

Another objective of the present invention is to provide a small apparatus for identifying biological particles, in which an antigen-antibody reaction for biological particle detection occurs more effectively by addition of an additional buffer solution.

Technical Solution

The present invention is implemented by embodiments having the following configuration in order to achieve the above objectives.

According to one embodiment of the present invention, a small apparatus for identifying biological particles according to the present invention includes: a discharge module unit to which a filter module in which biological particles are collected is mounted, and configured to separate the biological particles from the filter module by spraying a cleaning solution to the filter module and to discharge a solution in which the separated biological particles are included; a moving unit provided below the discharge module unit 1 so as to be movable; an image identification unit identifying the biological particles by capturing and analyzing an image; and an operation control unit controlling the operation of the apparatus, wherein the moving unit may include a sample bottle accommodating the solution in which the biological particles discharged by the discharge module unit are included, and a plurality of ticket modules each of which includes an antibody for detecting the biological particles, the discharge module unit may suction the solution accommodated in the sample bottle and injects the solution into each of the plurality of ticket modules, and the image identification unit may analyze a reaction occurring in each of the ticket modules to identify the biological particles.

According to another embodiment of the present invention, the discharge module unit may include a filter mounting part to which the filter module is mounted, a discharge module separating the biological particles from the filter module mounted to the filter mounting part and discharging the separated biological particles, a module driving part moving the discharge module in upward and downward directions, and a suction/injection control part controlling suction and injection through the discharge module, wherein the filter mounting part may include a filter mounting frame formed in a shape of a plate of a predetermined width, a filter assembly mounted to the filter mounting frame with the filter module inserted in the filter assembly, and a cleaning solution bottle accommodating the cleaning solution for separating the biological particles from the filter module and being mounted to the filter mounting frame; the discharge module may include a suction tube inserted into the cleaning solution bottle to suction the cleaning solution, and a nozzle module inserted into the filter assembly to spray the cleaning solution suctioned by the suction tube to the filter module; and the suction/injection control part may include a pump module providing power for suction and injection by the discharge module, a pump control module controlling the pump module, and a valve module provided as a 3-WAY valve and selectively controlling suction of the cleaning solution by the suction tube or spraying of the suctioned cleaning solution by the nozzle module.

According to still another embodiment of the present invention, the filter module may include a filter on which the biological particles are caught, and a filter housing fixing the filter; and the filter assembly may include a lower cover into which the filter module is inserted and fixed, and an upper cover coupled to an upper side of the lower cover, wherein the lower cover may include a filter module insertion groove recessed downward to a predetermined depth and into which the filter housing is inserted, a solution accommodating area forming a space in which the cleaning solution including the biological particles separated from the filter is accommodated, a solution discharge passage protruding downward from the solution accommodating area to form a passage through which the cleaning solution including the biological particles is discharged, and a lower cap sealing the solution discharge passage; and the upper cover may include a nozzle insertion hole formed to pass through an upper portion of the upper cover and through which the nozzle module is inserted, and an upper cap sealing the nozzle insertion hole.

According to still another embodiment of the present invention, the module driving part may include an upward/downward driving module moving the filter mounting frame in upward and downward directions, and a nozzle driving module moving the nozzle module in upward and downward directions.

According to still another embodiment of the present invention, the operation control unit may include a suction/discharge control part separating the biological particles from the filter module and accommodating the solution including the biological particles in the sample bottle, wherein the suction/discharge control part may include a sample bottle moving module moving the sample bottle to a position under the nozzle module, an upward/downward movement control module adjusting a height of the filter mounting part by the module driving part, a cleaning solution suction module suctioning the cleaning solution from the cleaning solution bottle by controlling operation of the pump control module, a valve control module allowing the suctioned cleaning solution to flow to the nozzle module by operation of the valve module, and a cleaning solution discharge module discharging the suctioned cleaning solution to the nozzle module by controlling operation of the pump control module.

According to still another embodiment of the present invention, the operation control unit may include a sample injection part injecting the solution accommodated in the sample bottle by the suction/discharge control part into the plurality of ticket modules, wherein the sample injection part may include a sample suction module allowing the nozzle module to suction a predetermined amount of the solution discharged into the sample bottle, an automatic movement module automatically moving the moving unit at a predetermined interval such that the suctioned solution is injected into each of the ticket modules, an automatic lifting module automatically adjusting a height of the nozzle module at a position of each of the ticket modules, and a fixed-amount dispensing module automatically injecting a fixed amount of the solution suctioned by the nozzle module into each of the ticket modules.

According to still another embodiment of the present invention, the operation control unit may include a buffer solution adding part injecting an additional buffer solution into the solution accommodated in the sample bottle; and the moving unit may include an additional buffer solution bottle accommodating the additional buffer solution, wherein the buffer solution adding part may include a bottle moving module moving the additional buffer solution bottle to the position under the nozzle module, a downward movement module moving the filter mounting part downward, a buffer solution suction module suctioning the additional buffer solution from the additional buffer solution bottle, a sample bottle moving module moving the sample bottle to the position under the nozzle module by moving the moving unit, and a solution discharge module discharging the suctioned additional buffer solution into the sample bottle.

Advantageous Effects

The present invention can achieve the following effects by the above embodiments, and the configuration, combination, and use relationship described below.

First, in a single apparatus having a simple structure, a cleaning solution is suctioned to separate biological particles from a filter and a sample solution is discharged, the discharged sample solution is injected into a plurality of ticket modules, and the biological particles are identified by image analysis for the ticket modules. Therefore, it is possible to realize a miniaturized apparatus.

Second, a filter module e.g. monitoring equipment is transferred in a sealed state by using a filter assembly and mounted to the apparatus. Therefore, it is possible to prevent contamination of a filter and the surrounding environment thereof and to enable easy transfer and mounting of the filter module.

Third, a filter mounting part and a nozzle module are movable in upward and downward directions, and the ticket modules and a sample bottle are movable in forward, rearward, leftward, and rightward directions. Therefore, it is possible to quickly and easily perform discharging and injection of a solution, image capturing, and biological particle identification.

Fourth, an antigen-antibody reaction for biological particle detection can occur more effectively by addition of an additional buffer solution.

DESCRIPTION OF DRAWINGS

FIG. 1 is a block diagram illustrating a small apparatus for identifying biological particles according to an embodiment of the present invention.

FIG. 2 is a view illustrating a configuration of a discharge module unit of FIG. 1.

FIG. 3 is an exploded perspective view illustrating a filter assembly of FIG. 2.

FIG. 4 shows sectional views illustrating the filter assembly.

FIG. 5 is a block diagram illustrating a configuration of an operation control unit.

FIG. 6 is a view illustrating a configuration of a discharge module unit according to another embodiment of the present invention.

DESCRIPTION OF THE REFERENCE NUMERALS IN THE DRAWINGS

1: discharge module unit
11: filter mounting part 111: filter mounting frame 112: filter assembly
112a: filter module 112a-1: filter 112a-2: filter housing
112b: lower cover 112b-1: filter module insertion groove 112b-2: solution accommodating area
112b-3: solution discharge passage 112b-4: lower cap 112c: upper cover
112c-1: nozzle insertion hole 112c-2: locking portion 112c-3: upper cap
113: cleaning solution bottle 12: discharge module 121: suction tube
122: nozzle module 122a: blocking member 123: fixing frame
13: module driving part 131: upward/downward driving module 132: nozzle driving module
14: suction/injection control part 141: pump module 142: pump control module
143: valve module 15: fixing support frame
2: moving unit
21: moving frame 211: ticket module 212: sample bottle 213: additional buffer solution bottle 22: movement control module 23: movement guide frame
3: image identification unit
31: camera module 32: image identification module
4: operation control unit
41: suction/discharge control part 42: buffer solution adding part 43: sample injection part
44: image control part

BEST MODE

Hereinafter, exemplary embodiments of a small apparatus for identifying biological particles according to the present invention will be described in detail with reference to the accompanying drawings. In the following description of the present invention, detailed descriptions of known functions and components incorporated herein will be omitted when it may make the subject matter of the present invention unclear. Unless the context clearly indicates otherwise, it will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "~ part", "~ unit", "module", and the like mean a unit for processing at least one function or operation and may be implemented by a combination of hardware and/or software.

A small apparatus for identifying biological particles according to an embodiment of the present invention will be described with reference to FIGS. 1 to 6. The small apparatus for identifying biological particles includes: a discharge module unit 1 to which a filter module 112a in which biological particles are collected is mounted, and configured to separate the biological particles from the filter module 112a by spraying a cleaning solution to the filter module 112a and to discharge a solution in which the separated biological particles are included; a moving unit 2 provided below the discharge module unit 1 so as to be movable; an image identification unit 3 identifying the biological particles by capturing and analyzing an image; and an operation control unit 4 controlling the operation of the apparatus for identifying biological particles.

The apparatus for identifying biological particles according to the present invention is configured such that the filter module 112a in which biological particles are collected from biological particle monitoring equipment, a biological particle collector, or the like is mounted and the cleaning solution is sprayed to the filter module 112a to separate the biological particles from the filter module 112a to generate a sample including the biological particles, and an antigen-antibody reaction is performed on the sample and image analysis is performed on the sample to detect the biological particles.

In particular, the apparatus for identifying biological particles allows such a series of processes to be performed in a single apparatus, and allows the structure thereof to be optimized for miniaturization and automatic control of the apparatus.

Furthermore, the apparatus for identifying biological particles prevents the filter module 112a from being contaminated or the biological particles collected in the filter module 112a from leaking externally in the process of transferring the filter module 112a to the apparatus. Moreover, the apparatus for identifying biological particles provides a plurality of ticket modules 211 in the apparatus to detect biological particles through various antigen-antibody reactions, thereby quickly performing accurate detection of biological particles and detection of various biological particles.

The discharge module unit 1 is a configuration to which the filter module 112a is mounted and spraying the cleaning solution to the mounted filter module 112a to separate the biological particles from the filter module 112a. The discharge module unit 1 may include a filter mounting part 11, a discharge module 12, a module driving part 13, a suction/injection control part 14, and a fixing support frame 15.

The filter mounting part 11 is configured to mount the filter module 112a to the apparatus. The filter mounting part 11 may include a filter mounting frame 111 to which the filter module 112a is mounted, a filter assembly 112 allowing the filter module 112a to be transferred and mounted in a sealed state, and a cleaning solution bottle 113 accommodating the cleaning solution for separating the biological particles from the filter module 112a.

The filter mounting frame 111 is formed in a shape of a plate of a predetermined width horizontal to the ground, and the filter assembly 112 and the cleaning solution bottle 113 are mounted to the filter mounting frame 111. The filter mounting frame 111 may be provided to be fixed to the fixing support frame 15 and may be provided to move in upward and downward directions by an upward/downward driving module 131 (to be described later) of the module driving part 13.

The filter assembly 112 is configured to accommodate the filter module 112a in a sealed state. The filter assembly 112 allows the filter module 112a to maintain in a sealed state in a form of filter assembly 112 when the filter module 112a is removed from a biological particle collector or the like. Furthermore, the filter assembly 112 allows the filter module 112a to be mounted to the filter mounting frame 111 in a form of the filter assembly 112 to separate the biological particles collected in the filter module 112a through spraying of the cleaning solution. To this end, as illustrated in FIG. 3, the filter assembly 112 may include the filter module 112a, a lower cover 112b, and an upper cover 112c.

The filter module 112a is configured to filter out the biological particles by being mounted to a biological particle collector or the like. The filter module 112a may include a filter 112a-1 in which the biological particles are caught and collected and a filter housing 112a-2 in which the filter 112a-1 is inserted in a fixed state. The filter module 112a is separated from a biological particle collector or the like and inserted into the filter assembly 112 in a sealed state and is mounted to the filter mounting frame 111 in a form of the filter assembly 112 such that injection of the cleaning solution is performed.

The lower cover 112b is configured to support the filter module 112a at a position therebelow. As illustrated in FIG. 4, the lower cover 112b may include a filter module insertion groove 112b-1 into which the filter housing 112a-2 is inserted, a solution accommodating area 112b-2 forming a space in which the cleaning solution passing through the filter 112a-1 is accommodated, a solution discharge passage 112b-3 through which the cleaning solution is discharged, and a lower cap 112b-4 sealing the solution discharge passage 112b-3.

The filter module insertion groove 112b-1 is configured such that the filter housing 112a-2 is inserted thereinto and fixed thereto. The filter module insertion groove 112b-1 is recessed downward to a predetermined depth to form a circular groove such that the filter housing 112a-2 formed in a cylindrical shape to be inserted thereinto.

The solution accommodating area 112b-2 is configured to form a predetermined space in which the cleaning solution passing through the filter 112a-1 is accommodated. The predetermined space may be formed in a shape having an open upper side, with a sectional area that is gradually reduced downwardly of the lower cover 112b. Accordingly, the solution accommodating area 112b-2 allows the biological particles to be effectively separated from the filter 112a-1 without causing the problem of overflow of the cleaning solution including the biological particles and allows the cleaning solution to be stably discharged through the solution discharge passage 112b-3. Furthermore, when the cleaning solution including the biological particles is accommodated in a sample bottle 212, which will be described later, and a predetermined amount of the cleaning solution is suctioned into the filter assembly 112 and injected into the ticket modules 211, the solution accommodating area 112b-2 provides a space for accommodating a suctioned sample and allows accurate injection of a fixed amount of the sample into the ticket modules 211.

The solution discharge passage 112b-3 is configured to form a passage through which the cleaning solution including the biological particles is discharged. The solution discharge passage 112b-3 may be formed to protrude downward from the lower cover 112b by a predetermined length. The solution discharge passage 112b-3 is in communication with the solution accommodating area 112b-2. Through the solution discharge passage 112b-3, not only the cleaning solution including the biological particles is discharged, but also suction of the sample accommodated in the sample bottle 212 and injection of the sample into the ticket module 211 are performed.

The lower cap 112b-4 is configured to seal the solution discharge passage 112b-3. The lower cap 112b-4 is inserted into the end of the solution discharge passage 112b-3 so as to be detachable from the solution discharge passage 112b-3. Accordingly, the lower cap 112b-4 prevents contamination of the filter 112a-1 and leaking of the biological particles during transfer of the filter assembly 112. Furthermore, the lower cap 112b-4 is separated only during separation of the biological particles by the cleaning solution and during suction and injection of the sample such that the solution discharge passage 112b-3 is opened.

The upper cover 112c is configured to be coupled to an upper side of the lower cover 112b. The upper cover 112c seals the filter module 112a inserted into the lower cover 112b, at the upper side of the lower cover 112b. The upper cover 112c may include a nozzle insertion hole 112c-1 into which a nozzle module 122 which will be described later is inserted, a locking portion 112c-2 coupled to the lower cover 112b, and an upper cap 112c-3 sealing the nozzle insertion hole 112c-1.

The nozzle insertion hole 112c-1 is configured to pass through an upper central portion of the upper cover 112c. The nozzle insertion hole 112c-1 allows the nozzle module 122 through which the cleaning solution is discharged to be inserted into the filter assembly 112. The nozzle insertion hole 112c-1 is sealed by a blocking member 122a (to be described later) of the nozzle module 122 in a state in which the nozzle module 122 is inserted into the filter assembly 112 and injection of the cleaning solution is performed in a sealed state of the nozzle insertion hole 112c-1. This can make it possible to prevent the cleaning solution or the biological particles from leaking externally or being contaminated by external contaminants.

The locking portion 112c-2 is configured to protrude downward from a lower end of the upper cover 112c and extend outward to form a bent shape. The locking portion 112c-2 is inserted into and coupled to the lower cover 112b, thereby allowing the upper cover 112c to be stably coupled to the lower cover 112b.

The upper cap 112c-3 is configured to seal the nozzle insertion hole 112c-1. The upper cap 112c-3 covers the nozzle insertion hole 112c-1 so as to be detachable therefrom. Accordingly, the upper cap 112c-3 prevents contamination of the filter 112a-1 and leaking of the biological particles during transfer of the filter assembly 112. Furthermore, the upper cap 112c-3 is separated only during connection of the nozzle module 122 such that the nozzle module 122 is inserted into the nozzle insertion hole 112c-1.

The cleaning solution bottle 113 is configured such that the cleaning solution therein is injected into the filter assembly 112 and separates the biological particles from the filter 112a-1. The cleaning solution bottle 113 may accommodate a buffer solution used for an antigen-antibody reaction in the ticket modules 211. The cleaning solution bottle 113 is configured to be mounted to the filter mounting frame 111. When a suction tube 121 (to be described later) of the discharge module 12 is inserted into the cleaning solution bottle 113, the cleaning solution is suctioned, and the suctioned cleaning solution is injected into the filter assembly 112 through the nozzle module 122 and accommodated in the sample bottle 212 together with the biological particles separated from the filter 112a-1.

The discharge module 12 is configured to suction the cleaning solution accommodated in the cleaning solution bottle 113 and to inject the cleaning solution into the filter assembly 112. As illustrated in FIG. 2, the discharge module 12 may include the suction tube 121 suctioning the cleaning solution, the nozzle module 122 discharging the suctioned cleaning solution to the filter assembly 112, and a fixing frame 123 fixing the suction tube 121 and the nozzle module 122.

The suction tube 121 is configured to be inserted into the cleaning solution bottle 113 to suction the cleaning solution. The suction tube 121 is fixed vertically to the fixing frame 123. The suction tube 121 is inserted into the cleaning solution bottle 113 in accordance with upward-and-downward movement of the filter mounting frame 111 and suctions the cleaning solution in accordance with the operation of a pump module 141 (to be described later) of the suction/injection control part 14. The suctioned cleaning solution is supplied to the nozzle module 122 in accordance with the operation of a valve module 143 and injected into the filter assembly 112.

The nozzle module 122 is configured to inject the cleaning solution into the filter assembly 112. The nozzle module 122 is inserted into the nozzle insertion hole 112c-1 to inject the cleaning solution in a state of sealing the inside of the filter assembly 112. The nozzle module 122 is fixed vertically to the fixing frame 123. The nozzle module 122 receives the cleaning solution suctioned from the cleaning solution bottle 113 by the pump module 141 and injects the cleaning solution into the filter assembly 112. Furthermore, the nozzle module 122 is configured to move up and down separately by a nozzle driving module 132 (to be described later) of the module driving part 13 and to seal the filter assembly 112 in a state in close contact with the filter assembly 112. This can make it possible to not only prevent leaking of the cleaning solution and contamination of the filter 112a-1, but also facilitate injection of the cleaning solution and suction and injection of the sample by the pump module 141. To this end, the nozzle module 122 may include the blocking member 122a provided separately therefrom and protruding along the perimeter thereof. When the nozzle module 122 is inserted into the nozzle insertion hole 112c-1, the blocking member 122a is brought into close contact with the periphery of the nozzle insertion hole 112c-1 such that the nozzle insertion hole 112c-1 can be stably maintained in a sealed state.

The fixing frame 123 is configured to fix the suction tube 121 and the nozzle module 122 in a vertical state. The fixing frame 123 is connected to and fixed to the fixing support frame 15.

The module driving part 13 is configured to drive the discharge module unit 1. The module driving part 13 may include the upward/downward driving module 131 driving the filter mounting frame 111 in upward and downward directions, and the nozzle driving module 132 driving the nozzle module 122 in upward and downward directions. For example, both the upward/downward driving module 131 and the nozzle driving module 132 may be provided as linear actuators, thereby enabling fine driving of the filter mounting frame 111 and the nozzle module 122.

The upward/downward driving module 131 moves the filter mounting frame 111 in upward and downward directions to allow the suction tube 121 to be inserted into the cleaning solution bottle 113 to suction the cleaning solution. Furthermore, the upward/downward driving module 131 adjusts the height between the solution discharge passage 112b-3 and the sample bottle 212, the ticket module 211, or an additional buffer solution bottle 213. Furthermore, the upward/downward driving module 131 allows discharge and injection of the cleaning solution including the biological particles, suction and injection of an additional buffer solution, and the like to be performed efficiently in the apparatus.

The nozzle driving module 132 is configured to move the nozzle module 122 in upward and downward directions. The nozzle driving module 132 allows the nozzle module 122 to be brought into close contact with the filter assembly 112 and inserted into the nozzle insertion hole 112c-1. Furthermore, the nozzle driving module 132 allows the nozzle module 122 to be mounted to or separated from the filter assembly 112 in accordance with upward movement of the nozzle module 122. Furthermore, the nozzle driving module 132 allows the degree of movement of the nozzle module 122 to be controlled in conjunction with the upward-and-downward movement of the filter mounting frame 111. As illustrated in FIG. 2, the nozzle driving module 132 may be provided to be fixed to a lower side of the fixing frame 123 to move the nozzle module 122. However, the present invention is not limited thereto. For example, as illustrated in FIG. 6, the nozzle driving module 132 may be provided to be supported on an upper portion of the fixing frame 123.

The suction/injection control part 14 is configured to control suction and injection of the cleaning solution, solution, and the like by the discharge module 12. The suction/injection control part 14 is connected to the suction tube 121 and the nozzle module 122 to allow the suction tube 121 and the nozzle module 122 to suction the cleaning solution or discharge the suctioned cleaning solution. Furthermore, the suction/injection control part 14 controls suction and injection of the sample, suction and injection of the additional buffer solution, and the like through the solution discharge passage 112b-3. To this end, the suction/injection control part 14 may include the pump module 141, a pump control module 142, and the valve module 143.

The pump module 141 is configured to provide power for suction or injection of the cleaning solution. The pump module 141 may use, for example, a syringe pump. Accordingly, the pump module 141 suctions the cleaning solution through the suction tube 121 or injects the cleaning solution through the nozzle module 122, in accordance with the operation thereof. Furthermore, the pump module 141 allows operations, such as suction of the sample accommodated in the sample bottle 212 and injection of the sample into the ticket modules 211, suction and injection of the additional buffer solution, and the like, to be performed through the solution discharge passage 112b-3.

The pump control module 142 is configured to control the operation of the pump module 141. The pump control module 142 may be provided as a linear actuator to allow fine operation of the pump module 141. With this configuration, the suction/injection control part 14 can precisely control suction and injection of the cleaning solution. In particular, when the sample is injected into the ticket modules 211, the suction/injection control part 14 can precisely control the injection amount of the sample, thereby efficiently injecting a fixed amount of the sample into the plurality of ticket modules 211.

The valve module 143 is configured to control suction and injection of the cleaning solution. Preferably, the valve module 143 may be provided as a 3-WAY valve. Accordingly, the valve module 143 is first connected to the suction tube 121 to suction the cleaning solution from the cleaning solution bottle 113 in accordance with the operation of the pump module 141, and then is connected to the nozzle module 122 in accordance with the operation of the valve module 143 to inject the suctioned cleaning solution into the filter assembly 112 through the nozzle module 122. As illustrated in FIG. 2, the valve module 143 may be provided to be fixed to the fixing support frame 15 to be connected to the suction tube 121 and the nozzle module 122 by a separate tube (not illustrated) or the like. However, the present invention is not limited thereto. For example, as illustrated in FIG. 6, the valve module 143 may be provided above the suction tube 121 to reduce the connection length between the valve module 143 and the suction tube 121 and the nozzle module 122, thereby making it possible to further reduce the size of the configuration of the apparatus and to perform more efficient suction and discharge of the cleaning solution.

The fixing support frame 15 is configured to support and fix respective configurations of the discharge module unit 1. The fixing support frame 15 may be provided vertically at one side of the discharge module unit 1 to fix the filter mounting frame 111, the fixing frame 123, and the suction/injection control part 14.

The moving unit 2 is provided below the discharge module unit 1 and is configured to move in a horizontal direction. The moving unit 2 may include a moving frame 21 moving in a state in which the ticket module 211, the sample bottle 212, and the additional buffer solution bottle 213 are accommodated therein, a movement control module 22 controlling the movement of the moving frame 21, and a movement guide frame 23 guiding the movement of the moving frame 21.

The moving frame 21 is configured to move below the discharge module unit 1 in a state in which the ticket module 211, the sample bottle 212, and the additional buffer solution bottle 213 are accommodated therein. The moving frame 21 may be moved in the horizontal direction, i.e., in forward and rearward directions, or in leftward and rightward directions. Accordingly, the moving frame 21 may be moved such that each of the ticket module 211, the sample bottle 212, the additional buffer solution bottle 213 reaches a position under the solution discharge passage 112b-3 and faces the same. With this movement of the moving frame 21, the cleaning solution including the biological particles is discharged into and accommodated in the sample bottle 212, the sample accommodated in the sample bottle 212 is suctioned through the solution discharge passage 112b-3 and injected into the plurality of ticket modules 211, and the additional buffer solution is suctioned from the additional buffer solution bottle 213 and injected into the sample bottle 212.

Each of the ticket modules 211 is configured to accommodate an antibody for identifying the biological particles through an antigen-antibody reaction with the biological particles. Since the plurality of ticket modules 211 is provided, this enables detection of various samples and various biological particles.

The sample bottle 212 is configured to accommodate the cleaning solution including the biological particles. The sample bottle 212 accommodates the cleaning solution that results from being injected into the filter assembly 112 and then passing through the filter 112a-1. The cleaning solution is accommodated in the sample bottle 212 in a state in which the biological particles are sufficiently separated from the entire filter 112a-1 through one injection of the cleaning solution into the filter assembly 112. The solution accommodated in the sample bottle 212 is suctioned at a required amount and injected into the ticket modules 211. This can make it possible for the biological particles caught on the filter 112a-1 to be separated therefrom as many as possible and included in the sample and can make it possible to effectively detect the biological particles.

The additional buffer solution bottle 213 is configured to accommodate the additional buffer solution to be injected into the sample bottle 212. For example, the additional buffer solution may be provided as a cell lysis buffer solution or the like. The addition of the additional buffer solution can make it possible to perform an antigen-antibody reaction more effectively. The additional buffer solution may be injected into the sample bottle 212 in which the cleaning solution including the biological particles is accommodated. To this end, a predetermined amount of the additional buffer solution is suctioned from the additional buffer solution bottle 213 through the solution discharge passage 112b-3, and then the suctioned additional buffer solution is injected into the sample bottle 212 through the solution discharge passage 112b-3.

The movement control module 22 is configured to control the movement of the moving frame 21. The movement control module 22 may use, for example, a linear actuator. Accordingly, the movement control module 22 controls the moving frame 21 to move finely. In particular, when a fixed amount of the sample is injected into the plurality of ticket modules 211, the movement control module 22 controls the moving frame 21 to move finely at a predetermined interval.

The movement guide frame 23 is provided on the bottom of the apparatus and is configured to guide the movement of the moving frame 21. The movement guide frame 23 is provided in forward, rearward, leftward, and rightward directions to allow the movement of the moving frame 21 to move in the forward, rearward, leftward, and rightward directions.

The image identification unit 3 is configured to precisely analyze color development through image capturing of each of the ticket modules 211. The image identification unit 3 may include a camera module 31 capturing an image, and an image identification module 32 analyzing the captured image and identifying the biological particles.

The camera module 31 is configured to capture an image of each of the ticket modules 211. When the ticket modules 211 are positioned under the camera module 31 by the movement of the moving frame 21, the camera module 31 captures the image of each of the ticket modules 211 and transmits the captured image to the image identification module 32. Furthermore, the camera module 31 may include a lighting module to accurately capture an image.

The image identification module 32 is configured to identify the biological particles by analyzing the image of each of the ticket modules 211. When the sample accommodated in the sample bottle 212 is injected into the ticket modules 211, in each of the ticket modules 211, a reaction such as color development occurs by an antigen-antibody reaction, and the image identification module 32 analyzes this to identify the type and number of the biological particles.

The operation control unit 4 is configured to control the operation of the apparatus for identifying biological particles. The operation control unit 4 allows the biological particles caught on the filter 112a-1 to be separated therefrom using the cleaning solution to form a sample, allows the additional buffer solution to be added to the formed sample to induce an antigen-antibody reaction more effectively, allows the sample to be injected into the plurality of ticket modules 211 to induce an antigen-antibody reaction, and allows an image for the ticket module 211 in which the sample is injected to be captured to enable identification of the biological particles. To this end, the operation control unit 4 may include a suction/discharge control part 41, a buffer solution adding part 42, a sample injection part 43, and an image control part 44.

The suction/discharge control part 41 is configured to separate the biological particles caught on the filter 112a-1 by using the cleaning solution, generate a sample solution including the biological particles, and accommodate the sample solution in the sample bottle 212. The suction/discharge control part 41 may include a sample bottle moving module 411, an upward/downward movement control module 412, a cleaning solution suction module 413, a valve control module 414, a nozzle control module 415, and a cleaning solution discharge module 416.

The sample bottle moving module 411 is configured to move the sample bottle 212 to a position at which the sample bottle 212 faces the solution discharge passage 112b-3. The sample bottle moving module 411 moves the moving frame 21 by the control of the movement control module 22.

The upward/downward movement control module 412 is configured to move the filter mounting frame 111 in upward and downward directions by controlling the upward/downward driving module 131. The upward/downward movement control module 412 allows the suction tube 121 to be inserted into the cleaning solution bottle 113, and after suction of the cleaning solution, the upward/downward movement control module 412 adjusts the height of the filter mounting frame 111 such that the height between the solution discharge passage 112b-3 and the sample bottle 212 becomes a height at which they are sufficiently close to each other.

The cleaning solution suction module 413 is configured to suction the cleaning solution in the cleaning solution bottle 113 through the suction tube 121. The cleaning solution suction module 413 operates the pump module 141 by the control of the pump control module 142.

The valve control module 414 is configured to operate the valve module 143 after suction of the cleaning solution to allow the valve module 143 to be connected to the nozzle module 122. The valve control module 414 allows the suctioned cleaning solution to be supplied to the nozzle module 122.

The nozzle control module 415 is configured to adjust the height of the nozzle module 122 by the control of the nozzle driving module 132. The nozzle control module 415 allows the nozzle module 122 to be inserted into the nozzle insertion hole 112c-1 and allows the blocking member 122a of the nozzle module 122 to be brought into close contact with the upper cover 112c to seal the nozzle insertion hole 112c-1.

The cleaning solution discharge module 416 is configured to inject the suctioned cleaning solution into the filter assembly 112 through the nozzle module 122. The cleaning solution discharge module 416 operates the pump module 141 by the operation of the pump control module 142. The cleaning solution injected by the cleaning solution discharge module 416 separates the biological particles from the filter 112a-1 and is accommodated in the sample bottle 212 together with the biological particles.

The buffer solution adding part 42 is configured to inject the additional buffer solution accommodated in the additional buffer solution bottle 213 into the sample bottle 212. The buffer solution adding part 42 may include a bottle moving module 421, a downward movement module 422, a buffer solution suction module 423, a sample bottle moving module 424, and a solution discharge module 425.

The bottle moving module 421 is configured to move the additional buffer solution bottle 213 to a position under the solution discharge passage 112b-3. The bottle moving module 421 moves the moving frame 21 by the operation of the movement control module 22.

The downward movement module 422 is configured to move the filter mounting frame 111 and the nozzle module 122 downward. The downward movement module 422 controls the upward/downward driving module 131 and the nozzle driving module 132 and allows the solution discharge passage 112b-3 to be inserted into the additional buffer solution bottle 213 to suction the additional buffer solution.

The buffer solution suction module 423 is configured to suction the additional buffer solution from the additional buffer solution bottle 213. The buffer solution suction module 423 suctions the additional buffer solution by the operation of the pump control module 142 and allows the suctioned additional buffer solution to be accommodated in the solution accommodating area 112b-2 of the filter assembly 112.

The sample bottle moving module 424 is configured to move the sample bottle 212 accommodating the sample solution to a position under the solution discharge passage 112b-3. The sample bottle moving module 424 moves the moving frame 21 by the operation of the movement control module 22.

The solution discharge module 425 is configured to inject the additional buffer solution accommodated in the solution accommodating area 112b-2 into the sample bottle 212. The solution discharge module 425 allows the additional buffer solution to be discharged to the sample bottle 212 by the operation of the pump control module 142.

The sample injection part 43 is configured to inject the sample solution accommodating in the sample bottle 212, i.e., the cleaning solution including the biological particles, into the plurality of ticket modules 211 to allow the biological particles to be detected by reaction with antibodies accommodated in the ticket modules 211. To this end, the sample injection part 43 may include a sample suction module 431, an automatic movement module 432, an automatic lifting module 433, and a fixed-amount dispensing module 434.

The sample suction module 431 is configured to suction the sample solution from the sample bottle 212. The sample solution is suctioned through the solution discharge passage 112b-3 when the solution discharge passage 112b-3 is inserted into the sample bottle 212, and the suctioned sample solution is accommodated in the solution accommodating area 112b-2.

The automatic movement module 432 is configured to automatically move the moving frame 21 to allow the solution discharge passage 112b-3 to inject the sample solution into the plurality of ticket modules 211. The automatic movement module 432 operates the movement control module 22 such that the sample solution is injected into each of the ticket modules 211 and then injected into a next ticket module 211 by automatic movement of the ticket modules 211.

The automatic lifting module 433 is configured to automatically lift the filter mounting frame 111 and the nozzle module 122 at a position of each of the ticket modules 211. The automatic lifting module 433 allows the solution discharge passage 112b-3 to be positioned at the position of each of the ticket modules 211 into which the sample solution is to be injected by the automatic movement module 432, lowers the solution discharge passage 112*b*-3 at the position of each of the ticket modules 211 to allow the solution discharge passage 112*b*-3 to inject the sample solution into each of the ticket modules 211, and, after injection of the sample solution, lifts the solution discharge passage 112*b*-3 again and allows the solution discharge passage 112*b*-3 to be positioned at a position of a next ticket module 211 by the movement of the ticket modules 211.

The fixed-amount dispensing module 434 is configured to inject a fixed amount of the sample solution into each of the ticket modules 211. The fixed-amount dispensing module 434 allows the fixed amount of the sample solution to be repeatedly injected into each of the ticket modules 211 by the operation of the pump control module 142.

The image control part 44 is configured to capture and analyze an image by the image identification unit 3. The image control part 44 allows automatic image capturing and analysis for each of the ticket modules 211. To this end, the image control part 44 may include a ticket moving module 441, an image capturing module 442, an image analysis start module 443, and a result display module 444.

The ticket moving module 441 is configured to move the ticket modules 211 to a position under the camera module 31 such that image capturing for each of the ticket modules 211 is performed. The ticket moving module 441 moves the moving frame 21 by the operation of the movement control module 22. The ticket moving module 441 automatically moves a ticket module 211 to be captured at a predetermined interval.

The image capturing module 442 is configured to perform image capturing for each of the ticket modules 211. The image capturing module 442 automatically performs image capturing every time the ticket module 211 is moved to the position under the camera module 31 by the ticket moving module 441.

The image analysis start module 443 is configured to automatically analyze a captured image when the image is captured by the image capturing module 442. The image analysis start module 443 allows the image identification module 32 to analyze the color development in each of the ticket modules 211 to identify the biological particles.

The result display module 444 is configured to display results of identification of the biological particles by the image identification module 32. The results of identification may be displayed on a separate display unit (not illustrated) provided at the apparatus, or may be transmitted to and displayed on a separate terminal.

Although the Applicant(s) have described various exemplary embodiments, the exemplary embodiments are only an example to achieve the technical spirit of the present invention and thus, it would be appreciated by those skilled in the art that changes or modifications may be made to the exemplary embodiments without departing from the principles and spirit of the present disclosure, the scope of which is defined by the claims and their equivalents.

The invention claimed is:

1. A small apparatus for identifying biological particles, the apparatus comprising:
a discharge module unit to which a filter module in which biological particles are collected is mounted, and configured to separate the biological particles from the filter module by spraying a cleaning solution to the filter module and to discharge a solution in which the separated biological particles are included;
a moving unit provided below the discharge module unit so as to be movable;
an image identification unit, which include a camera module and an image identification module, identifying the biological particles by capturing and analyzing an image; and
an operation control unit, which includes a suction/discharge control part separating the biological particles from the filter module and accommodating the solution including the biological particles in the sample bottle controlling the operation of the apparatus,
wherein the moving unit includes a sample bottle accommodating the solution in which the biological particles discharged by the discharge module unit are included, and a plurality of ticket modules each of which includes an antibody for detecting the biological particles,
the discharge module unit suctions the solution accommodated in the sample bottle and injects the solution into each of the plurality of ticket modules,
the image identification unit analyzes a reaction occurring in each of the ticket modules to identify the biological particles, and
the discharge module unit includes a filter mounting part to which the filter module is mounted, a discharge module separating the biological particles from the filter module mounted to the filter mounting part and discharging the separated biological particles, a module driving part moving the discharge module in upward and downward directions, and a suction/injection control part controlling suction and injection through the discharge module,
wherein the filter mounting part includes a filter mounting frame formed in a shape of a plate of a predetermined width, a filter assembly mounted to the filter mounting frame with the filter module inserted in the filter assembly, and a cleaning solution bottle accommodating the cleaning solution for separating the biological particles from the filter module and being mounted to the filter mounting frame;
the discharge module includes a suction tube inserted into the cleaning solution bottle to solution the cleaning solution, and a nozzle module inserted into the filter assembly to spray the cleaning solution suctioned by the suction tube to the filter module; and
the suction/injection control part includes a pump module providing power for suction and injection by the discharge module, a pump control module controlling the pump module, and a valve module provided as a 3-WAY valve and selectively controlling suction of the cleaning solution by the suction tube or spraying of the suctioned cleaning solution by the nozzle module.

2. The apparatus of claim 1, wherein the filter module includes a filter on which the biological particles are caught, and a filter housing fixing the filter; and
the filter assembly includes a lower cover into which the filter module is inserted and fixed, and an upper cover coupled to an upper side of the lower cover,
wherein the lower cover includes a filter module insertion groove recessed downward to a predetermined depth and into which the filter housing is inserted, a solution accommodating area forming a space in which the cleaning solution including the biological particles separated from the filter is accommodated, a solution discharge passage protruding downward from the solution accommodating area to form a passage through which the cleaning solution including the biological particles is discharged, and a lower cap sealing the solution discharge passage; and the upper cover includes a nozzle insertion hole formed to pass through an upper portion of the upper cover and through which the nozzle module is inserted, and an upper cap sealing the nozzle insertion hole.

3. The apparatus of claim 1, wherein the module driving part includes an upward/downward driving module moving the filter mounting frame in upward and downward directions, and a nozzle driving module moving the nozzle module in upward and downward directions.

4. The apparatus of claim 1,
wherein the suction/discharge control part includes a sample bottle moving module moving the sample bottle to a position under the nozzle module, an upward/downward movement control module adjusting a height of the filter mounting part by the module driving part, a cleaning solution suction module suctioning the cleaning solution from the cleaning solution bottle by controlling operation of the pump control module, a valve control module allowing the suctioned cleaning solution to flow to the nozzle module by operation of the valve module, and a cleaning solution discharge module discharging the suctioned cleaning solution to the nozzle module by controlling operation of the pump control module.

5. The apparatus of claim 1, wherein the operation control unit includes a sample injection part injecting the solution accommodated in the sample bottle by the suction/discharge control part into the plurality of ticket modules,
wherein the sample injection part includes a sample suction module allowing the nozzle module to suction a predetermined amount of the solution discharged into the sample bottle, an automatic movement module automatically moving the moving unit at a predetermined interval such that the suctioned solution is injected into each of the ticket modules, an automatic lifting module automatically adjusting a height of the nozzle module at a position of each of the ticket modules, and a fixed-amount dispensing module automatically injecting a fixed amount of the solution suctioned by the nozzle module into each of the ticket modules.

6. The apparatus of claim 1, wherein the operation control unit includes a buffer solution adding part injecting an additional buffer solution into the solution accommodated in the sample bottle; and
the moving unit includes an additional buffer solution bottle accommodating the additional buffer solution,
wherein the buffer solution adding part includes a bottle moving module moving the additional buffer solution bottle to the position under the nozzle module, a downward movement module moving the filter mounting part downward, a buffer solution suction module suctioning the additional buffer solution from the additional buffer solution bottle, a sample bottle moving module moving the sample bottle to the position under the nozzle module by moving the moving unit, and a solution discharge module discharging the suctioned additional buffer solution into the sample bottle.

\* \* \* \* \*